US007314410B2

(12) United States Patent
Baerlocher et al.

(10) Patent No.: US 7,314,410 B2
(45) **Date of Patent: *Jan. 1, 2008**

(54) GAMING DEVICE HAVING A BONUS ROUND WITH A WIN, LOSE OR DRAW OUTCOME

(75) Inventors: Anthony J. Baerlocher, Reno, NV (US); Andrea Hughs-Baird, Reno, NV (US)

(73) Assignee: IGT, Reno, NV (US)

( * ) Notice: Subject to any disclaimer, the term of this patent is extended or adjusted under 35 U.S.C. 154(b) by 60 days.

This patent is subject to a terminal disclaimer.

(21) Appl. No.: 11/380,844

(22) Filed: Apr. 28, 2006

(65) Prior Publication Data

US 2006/0189370 A1 Aug. 24, 2006

Related U.S. Application Data

(63) Continuation of application No. 10/163,805, filed on Jun. 5, 2002, now Pat. No. 7,037,192, which is a continuation of application No. 09/772,763, filed on Jan. 30, 2001, now Pat. No. 6,425,824.

(51) Int. Cl.
*A63F 13/00* (2006.01)

(52) U.S. Cl. ...................................... 463/16; 273/138.1

(58) Field of Classification Search ............ 463/16–21; 273/138.1, 143 R, 142 R, 143 A, 142 B, 273/142 D, 138 A
See application file for complete search history.

(56) References Cited

U.S. PATENT DOCUMENTS 3,048,402 A 8/1962 Schaper
4,327,919 A 5/1982 Vennor
4,488,727 A 12/1984 Lam
4,582,324 A 4/1986 Koza et al.
4,695,053 A 9/1987 Vazquez, Jr. et al.

(Continued)

FOREIGN PATENT DOCUMENTS

JP 408155134 A 6/1996

(Continued)

OTHER PUBLICATIONS

Double Up Poker Game Description written by IGT, available prior to 2000.

(Continued)

*Primary Examiner*—Scott E. Jones
(74) *Attorney, Agent, or Firm*—Bell, Boyd & Lloyd LLP

(57) ABSTRACT

The system and method enables the player to select a choice from a plurality of choices, wherein one or more choices can trump or beat one or more other choices, and wherein one or more choices do not trump or beat but rather tie one or more other choices. The game randomly generates an outcome from a set of possible outcomes including: a win outcome, a draw outcome and a lose outcome. Based on the player's choice and the generated outcome, the game determines and displays a game choice, which when compared to the player's choice, yields the generated outcome. If positive or neutral outcome is generated, the game continues. If negative, the game ends and the player keeps any accumulated award.

69 Claims, 11 Drawing Sheets

114

| | |
|---|---|
| A TRUMPS B | |
| A TRUMPS D | |
| B TRUMPS C | |
| B TRUMPS E | |
| C TRUMPS A | |
| C TRUMPS D | |
| D TRUMPS B | |
| D TRUMPS E | |
| E TRUMPS C | |
| E TRUMPS A | |

116

| | |
|---|---|
| A | 20% |
| B | 20% |
| C | 20% |
| D | 20% |
| E | 20% |

U.S. PATENT DOCUMENTS

| | | | |
|---|---|---|---|
| 5,034,807 | A | 7/1991 | Von Kohorn |
| 5,342,047 | A | 8/1994 | Heidel et al. |
| 5,890,962 | A | 4/1999 | Takemoto |
| 5,944,314 | A | 8/1999 | Stavinsky |
| 5,951,397 | A | 9/1999 | Dickinson |
| 5,997,401 | A | 12/1999 | Crawford |
| 6,015,346 | A | 1/2000 | Bennett |
| 6,068,553 | A | 5/2000 | Parker |
| 6,089,976 | A | 7/2000 | Schneider |
| 6,102,798 | A | 8/2000 | Bennett |
| 6,126,542 | A | 10/2000 | Fier |
| 6,159,098 | A | 12/2000 | Slomiany et al. |
| 6,164,652 | A | 12/2000 | Lauretta et al. |
| 6,174,235 | B1 | 1/2001 | Walker et al. |
| 6,190,255 | B1 | 2/2001 | Thomas et al. |
| 6,203,429 | B1 | 3/2001 | Demar et al. |
| 6,210,279 | B1 | 4/2001 | Dickinson |
| 6,227,969 | B1 | 5/2001 | Yoseloff |
| D457,571 | S | 5/2002 | Edwards, Jr. |

FOREIGN PATENT DOCUMENTS

| | | | |
|---|---|---|---|
| JP | 10048363 | A | 2/1998 |
| JP | 2000-14933 | | 1/2000 |
| JP | 2000-254350 | | 9/2000 |
| JP | 7-185126 | | 4/2006 |
| KR | 20011066723 | A | 7/2001 |

OTHER PUBLICATIONS

Janken-8 II Brochure written by Hsin Chen Wen Enterprises Co., Ltd., published prior to 2000.

Polly & Roger Brochure written by VLC, Inc., published in 2000.

Top Gear Brochure written by Aristocrat Leisure Industries Pty. Ltd, published Sep. 1995.

Fey, Marshall, Slot Machines A Pictorial History of the First 100 Years.

FIG.3A
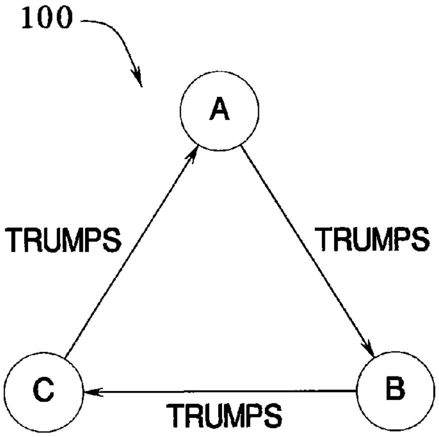
FIG.3B
102
| |
|---|
| A TRUMPS B |
| B TRUMPS C |
| C TRUMPS A |
FIG.3C
104
| | |
|---|---|
| A | 33.3% |
| B | 33.3% |
| C | 33.3% |
FIG.4A
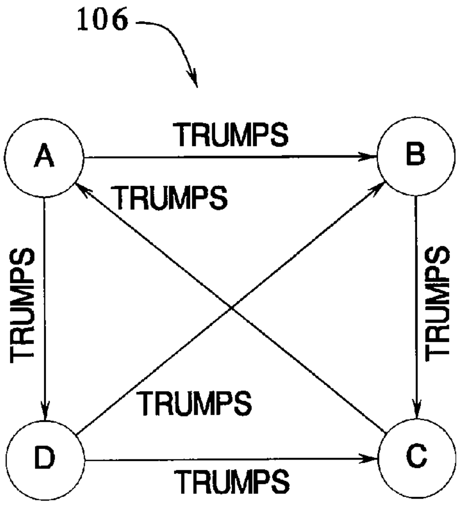
FIG.4B
108
| |
|---|
| A TRUMPS B |
| A TRUMPS D |
| B TRUMPS C |
| C TRUMPS A |
| D TRUMPS B |
| D TRUMPS C |
FIG.4C
110
| | |
|---|---|
| A | 30% |
| B | 10% |
| C | 30% |
| D | 30% |

114

| | |
|---|---|
| A TRUMPS B |
| A TRUMPS D |
| B TRUMPS C |
| B TRUMPS E |
| C TRUMPS A |
| C TRUMPS D |
| D TRUMPS B |
| D TRUMPS E |
| E TRUMPS C |
| E TRUMPS A |

116

| | |
|---|---|
| A | 20% |
| B | 20% |
| C | 20% |
| D | 20% |
| E | 20% |

120

| |
|---|
| A TRUMPS B |
| A TRUMPS G |
| B TRUMPS C |
| B TRUMPS D |
| C TRUMPS A |
| C TRUMPS D |
| D TRUMPS E |
| D TRUMPS F |
| E TRUMPS C |
| E TRUMPS F |
| F TRUMPS G |
| F TRUMPS H |
| G TRUMPS E |
| G TRUMPS H |
| H TRUMPS A |
| H TRUMPS B |

122

| | |
|---|---|
| A | 12.5% |
| B | 12.5% |
| C | 12.5% |
| D | 12.5% |
| E | 12.5% |
| F | 12.5% |
| G | 12.5% |
| H | 12.5% |

FIG.7A

124

| | |
|---|---|
| WIN | 33.3% |
| LOSE | 33.3% |
| DRAW | 33.3% |

FIG.7B

126

| | |
|---|---|
| WIN | 25% |
| LOSE | 25% |
| DRAW | 50% |

FIG.7C

128

| | |
|---|---|
| WIN | 40% |
| LOSE | 30% |
| DRAW | 30% |

FIG.7D

130

| | |
|---|---|
| WIN | 35% |
| LOSE | 35% |
| DRAW | 30% |

FIG.9

162

| | | |
|---|---|---|
| 3 | 2 | 30% |
| 5 | 2 | 30% |
| 7 | 2 | 15% |
| 9 | 0 | 10% |
| 12 | 0 | 5% |
| 15 | 0 | 4% |
| 20 | 0 | 3% |
| 27 | 0 | 2% |
| 40 | 0 | 1% |

164 166 168

GAMING DEVICE HAVING A BONUS ROUND WITH A WIN, LOSE OR DRAW OUTCOME

PRIORITY CLAIM

This application is a continuation of and claims the benefit of U.S. patent application Ser. No. 10/163,805, filed Jun. 5, 2002, now U.S. Pat. No 7,037,192 which is a continuation and claims the benefit of U.S. patent application Ser. No. 09/772,763, filed Jan. 30, 2001, now issued U.S. Pat. No. 6,425,824.

CROSS-REFERENCES TO RELATED APPLICATIONS

This application is related to the following commonly-owned co-pending patent applications: "GAMING DEVICE HAVING AN AWARD LEVEL DETERMINATION COMPETITION," Ser. No. 10/241,325, now U.S. Pat. No. 7,192, 344, "GAMING DEVICE HAVING COMPETITION CONFIGURATION, ATTACK AND COUNTERMEASURE GAME," Ser. No. 11/557,855; "GAMING DEVICE HAVING AN AWARD LEVEL DETERMINATION COMPETITION." Ser. No. 11/724.920; and "GAMING DEVICE HAVING AN AWARD LEVEL DETERMINATION COMPETITION,"Ser. No. 11/724,925.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device bonus round having player selectable choices that prompt the game to generate a win, lose or draw outcome.

BACKGROUND OF THE INVENTION

In known go-until gaming device bonus rounds, when a player makes a selection from a set of randomly placed masked awards, the game reveals the selected outcome, which results in the player winning an award or losing the opportunity to win further awards. For example, European Patent Application No. EP 0 945 837 A2 filed on Mar. 18, 1999 and assigned on its face to WMS Gaming, Inc. discloses a game in which a player has one or more opportunities to select masked bonus awards from a pattern or group of masked awards. When the player selects a masked award, the player receives the value of the award. This process continues until the player selects a masked terminator, which ends the game, whereby the player keeps the previously accumulated awards. In no instance does the selection of a randomly assigned masked award yield a neutral outcome, i.e., a tie or a draw.

In "double up" video poker gaming machines, a player can risk a currently achieved award to double the player's award. In such games, the dealer deals the player and the dealer a card. If the player's card beats the dealer's card, the player obtains double the award. If the dealer's card wins, the player gets nothing. A tie results if the dealer deals out two cards having the same rank, whereafter the player can try again. In video blackjack gaming machines, the player and the dealer can also tie.

In an attempt to make gaming devices more exciting and enjoyable for a player, gaming device manufacturers strive to make games more suspenseful or generally suspense building. One method and apparatus for making games more suspenseful includes a bonus game that provides tie or draw outcomes, which does not require a player to risk a currently achieved award.

SUMMARY OF THE INVENTION

The present invention includes a bonus round of a gaming device, which provides the player with a plurality of selections, wherein the selections prompt the gaming device to generate an outcome, and wherein the outcome can be a positive outcome for the player, a negative outcome for the player or a neutral outcome for the player. The present invention displays a plurality of choices to the player and enables the player to select one of the choices.

The game preferably includes a database of choice comparisons or a choice comparator that takes any two of the choices presented to the player and determines a winner between the two choices. The game preferably reveals which choices beat or trump which other choices. In one embodiment, the player and the game each randomly generate a choice, whereby the game provides a positive outcome to the player if the player's choice trumps the game's choice, the game provides a negative outcome to the player if the game's choice trumps the player's choice and the game provides a neutral outcome if the player's choice is the same as or equal to the game's choice.

In a second embodiment, the game additionally includes a database of outcomes; namely, a positive player outcome, a negative player outcome and a neutral player outcome. The game can equally weight the outcomes or weight the outcomes so that the game randomly selects one or more outcomes more often than one or more other outcomes. In this embodiment, the player makes a choice and the game randomly generates an outcome, which can be a weighted outcome.

When the game generates a positive player outcome, the game determines its appropriate choice from the comparison database and displays both its choice and the positive outcome to the player. This embodiment proceeds backwards with respect to the previous embodiment. When the game generates a negative player outcome, the game determines its appropriate choice from the comparison database and displays both its choice and the negative outcome to the player. When the game generates a neutral player outcome, the game determines its appropriate choice from the comparison database and displays both the choice and the neutral outcome to the player.

In both bonus round embodiments, the game enables the player to continue to play until a negative outcome occurs. The player keeps any prior awards from positive outcomes and does not risk achieved awards for the chance to accumulate a higher award.

The game contemplates different choice display embodiments described in detail below. In one embodiment, the game structures the choice comparisons such that each choice either trumps or is trumped by every other choice. In this embodiment, only a random selection of the same choice by the player and the game generates a neutral outcome. Or, if the game randomly selects a neutral outcome, the game has only one choice to choose, the choice that the player selected.

In another embodiment, the game structures the choice comparisons such that not every choice trumps or is trumped by every other choice. In this other embodiment, a random selection of the player's choice or a choice not trumping or trumped by the player's choice generates a neutral outcome. Or, if the game randomly selects a neutral outcome, the game can randomly select the choice that the player selected or a choice not trumping or trumped by the player's choice.

It is therefore an advantage of the present invention to provide a gaming device having player selectable choices that prompt the game to generate a win, lose and draw outcome.

Another advantage of the present invention is to provide a gaming device having player selectable choices that prompt the game to generate a win, lose and draw outcome, whereby each choice trumps or is trumped by every other choice.

A further advantage of the present invention is to provide a gaming device having player selectable choices that prompt the game to generate a win, lose and draw outcome, whereby each choice does not trump or become trumped by every other choice.

Yet another advantage of the present invention is to provide a gaming device having win, lose or draw outcomes, whereby the player randomly selects a choice, the game randomly generates a choice and the game determines an outcome based on the selected and generated choices.

Still a further advantage of the present invention is to provide a gaming device having win, lose or draw outcomes, whereby the player randomly selects a choice, the game randomly generates an outcome and the game determines a choice based on the player's selected choice and the game's generated outcome.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE DRAWINGS

FIGS. 3A through 3C are schematic diagrams that illustrate a three choice embodiment, wherein each choice of the embodiment either trumps or is trumped by every other choice of the embodiment;

FIGS. 4A through 4C are a diagram and tables that illustrate a four choice embodiment, wherein each choice of the embodiment either trumps or is trumped by every other choice of the embodiment;

FIGS. 7A through 7D are tables of outcome databases having different probability distributions, wherein the game employs the databases to generate an outcome and thereby determine a game choice;

FIG. 9 is a prize table including a win column, a consolation column and a percent column, which illustrates a random prize selection embodiment of the present invention;

DETAILED DESCRIPTION OF THE INVENTION

Gaming Device and Electronics

Figure 1A:
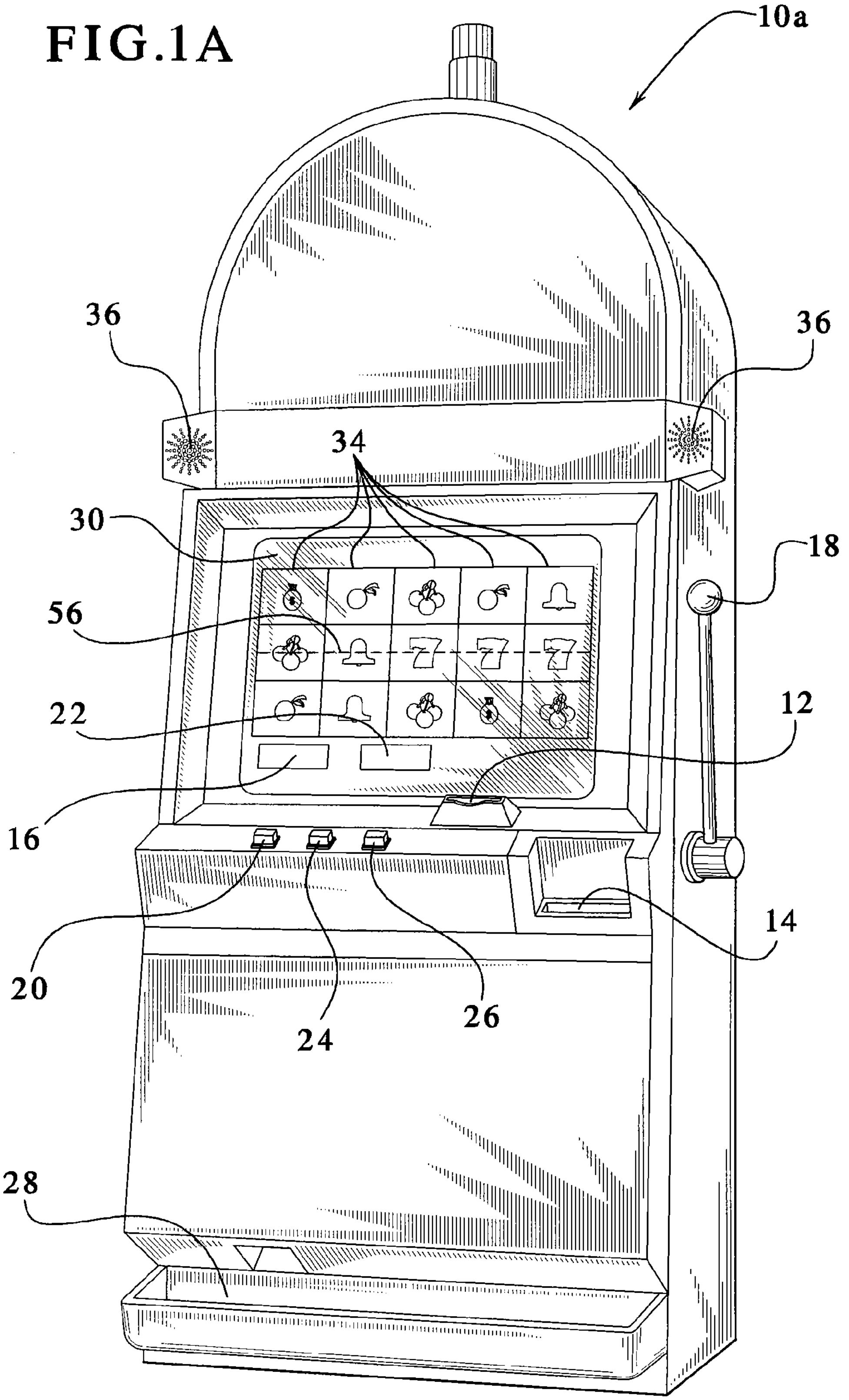
FIG. 1A is a front-side perspective view of one embodiment of the gaming device of the present invention.
Figure 1B:
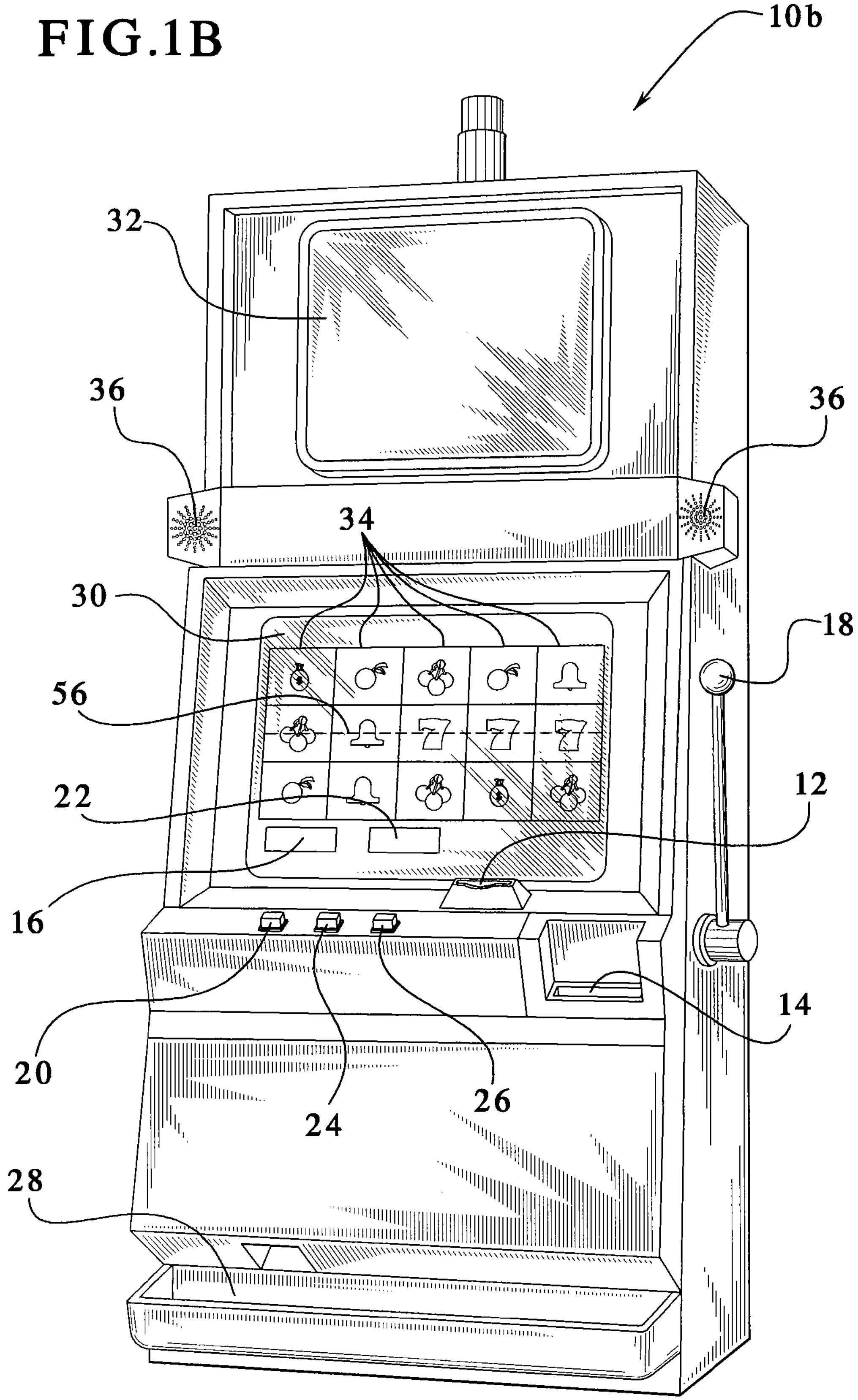
FIG. 1B is a front-side perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a handheld video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or a ticket voucher in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player, which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button

24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit vouchers redeemable by a cashier or electronically recordable cards, which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other static or dynamic display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
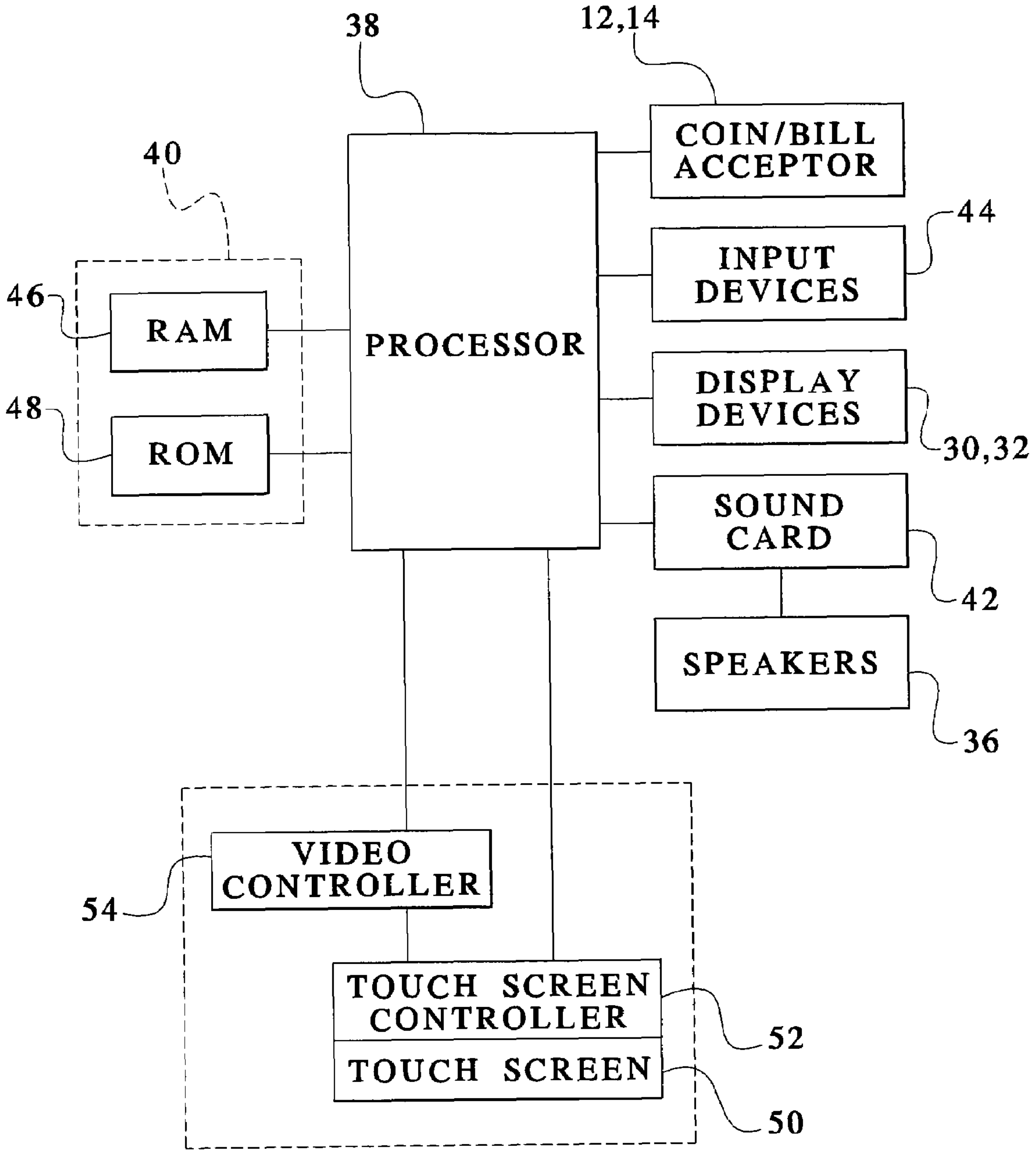
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 are generally referred to herein as the "computer" or the "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Choice Structures, Choice Databases and Generation Databases

Referring now to FIGS. 3A through 3C, the present invention includes a three choice embodiment, wherein each choice of the embodiment either trumps or is trumped by every other choice of the embodiment. FIG. 3A illustrates a choice structure 100, which includes three choices "A," "B" and "C," and which the game preferably displays to the player via one of the display devices 30 or 32. The choices can be areas of a touch screen 50 (FIG. 2) or be associated with one or more electromechanical selectors. Arrows pointing from one choice to another indicate that: "A" trumps "B," "B" trumps "C" and "C" trumps "A." FIG. 3B illustrates a choice comparison table or database 102, which includes the comparisons or comparators of FIG. 3A. The memory device 40 (FIG. 2) stores the choice comparison table or database 102, which the processor 38 can access at the appropriate moments.

It should be appreciated that in the choice structure 100, each choice either trumps or is trumped by every other choice. The choice structure 100 also maintains an equal percentage that any choice will either trump or be trumped. That is, there is a fifty percent chance that "A" trumps "B" and that "C" trumps "A" if the player or the game selects choice "A." To maintain an equally weighted game, as illustrated in FIG. 3C, the game preferably maintains a choice generation table or database 104 in the memory device 40, which includes equally weighted choices "A,"

"B" and "C." The game alternatively weights the choices such that the game randomly generates one choice more often than the other two. If a player learns that the game is more likely to choose "A" and knows that "C" trumps "A," the player will likely always choose "C" and master the game.

Referring now to FIGS. 4A through 4C, the present invention includes a four choice embodiment, wherein each choice of the embodiment either trumps or is trumped by every other choice of the embodiment. FIG. 4A illustrates a choice structure 106, which includes four choices "A," "B," "C" and "D," and which the game preferably displays to the player via one of the display devices 30 or 32. The choices can be areas of a touch screen 50 (FIG. 2) or be associated with one or more electromechanical selectors. Arrows pointing from one choice to another indicate that: "A" trumps "B," "A" trumps "D," "B" trumps "C," "C" trumps "A," "D" trumps "B" and "D" trumps "C." FIG. 4B illustrates a choice comparison table or database 108, which includes the comparisons or comparators of FIG. 4A. The memory device 40 (FIG. 2) stores the choice comparison database 108, which the processor 38 can access at the appropriate moments.

It should be appreciated that in the choice structure 106, each choice either trumps or is trumped by every other choice. The choice structure 106 thereby maintains an unequal percentage that any choice will either trump or be trumped. That is, there is a 66.7 percent chance that "A" trumps "B" or that "A" trumps "D" and only a 33.3 percent chance that "C" trumps "A" if the player or the game selects choice "A." Likewise, there is a 66.7 percent chance that "A" trumps "B" or that "D" trumps "B" and only a 33.3 percent chance that "B" trumps "C" if the player or the game selects choice "B." It should be appreciated from FIGS. 4A and 4B that "A" and "D" are better choices than "B" or "C."

As illustrated in FIG. 4C, since the player preferably knows the choice structure 106, the game preferably maintains a choice generation table or database 110 in the memory device 40, which includes unequally weighted choices "A," "B," "C" and "D." In this table, the game randomly generates "A," "C" and "D" ninety percent of the time and "B" ten percent of the time, as illustrated, to counteract the choice structure 106. The embodiment of FIGS. 4A though 4C creates a complicated dynamic between the game and a player who learns of the unequally weighted choice generation database 110. Knowing that the game is more likely to choose "A," "C" or "D" and the choice structure 106, the player can then pick in an attempt to try to defeat those choices.

Figures 5A, 5B, 5C:
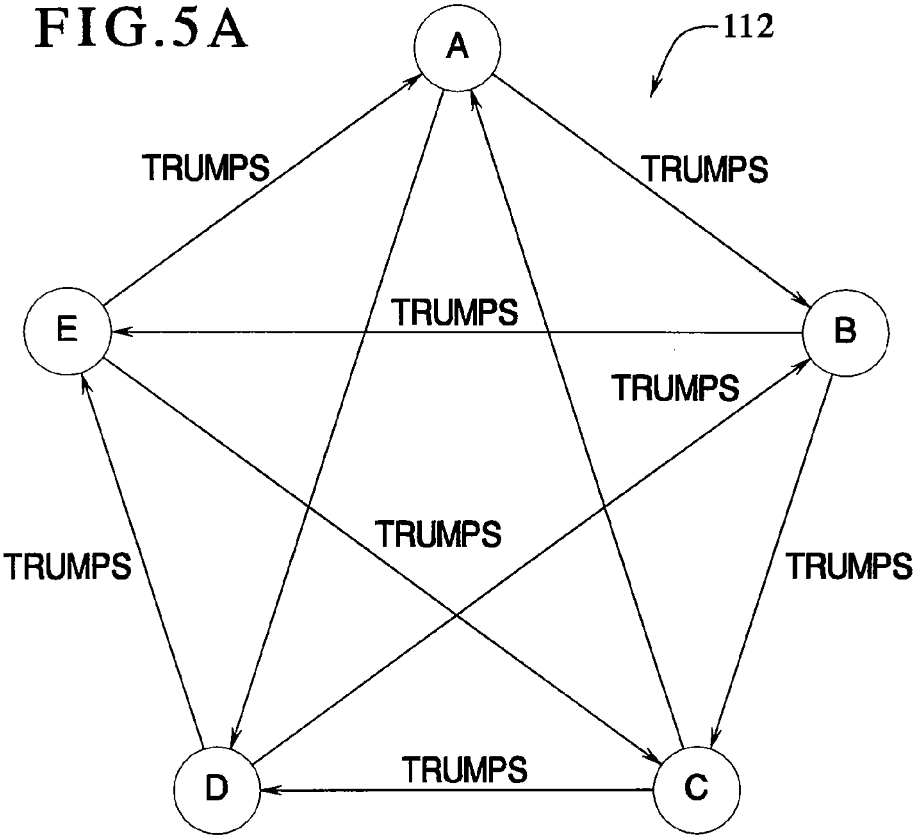
FIGS. 5A through 5C are a diagram and tables that illustrate a five choice embodiment, wherein each choice of the embodiment either trumps or is trumped by every other choice of the embodiment.

Referring now to FIGS. 5A through 5C, the present invention includes a five choice embodiment, wherein each choice of the embodiment either trumps or is trumped by another choice of the embodiment. FIG. 5A illustrates a choice structure 112, which includes five choices "A," "B," "C," "D" and "E," and which the game preferably displays to the player via one of the display devices 30 or 32. The choices can be areas of a touch screen 50 (FIG. 2) or be associated with one or more electromechanical selectors. Arrows pointing from one choice to another indicate that: "A" trumps "B," "A" trumps "D," "B" trumps "C," "B" trumps "E," "C" trumps "A," "C" trumps "D," "D" trumps "B," "D" trumps "E," "E" trumps "C" and "E" trumps "A." FIG. 5B illustrates a choice comparison table or database 114, which includes the comparisons or comparators of FIG. 5A. The memory device 40 (FIG. 2) stores the choice comparison database 114, which the processor 38 can access at the appropriate moment.

It should be appreciated that in the choice structure 112, each choice either trumps or is trumped by every other choice. The choice structure 112 also maintains an equal percentage that any choice will either trump or be trumped. That is, there is a fifty percent chance that "A" trumps "B" or that "A" trumps "D." There is also a fifty percent chance that "C" trumps "A" or that "E" trumps "A" if the player or the game selects choice "A." To maintain an equally weighted game, as illustrated in FIG. 5C, the game preferably maintains a choice generation table or database 116 in the memory device 40, which includes equally weighted choices "A" through "E," i.e., there is a 20% chance that the game generates each.

The choice structure 112 illustrates that the present invention includes providing any number of choices. Odd number embodiments, such as the choice structures 100 and 112, have an even number of combatant choices, which facilitates a choice structure having choices with equal chances of winning or losing. Even numbered embodiments, such as the choice structure 106, have an odd number of combatant choices and unequal winning percentages, unless as described below, some choice pairs do not have an associated comparator.

Figures 6A, 6B, 6C:
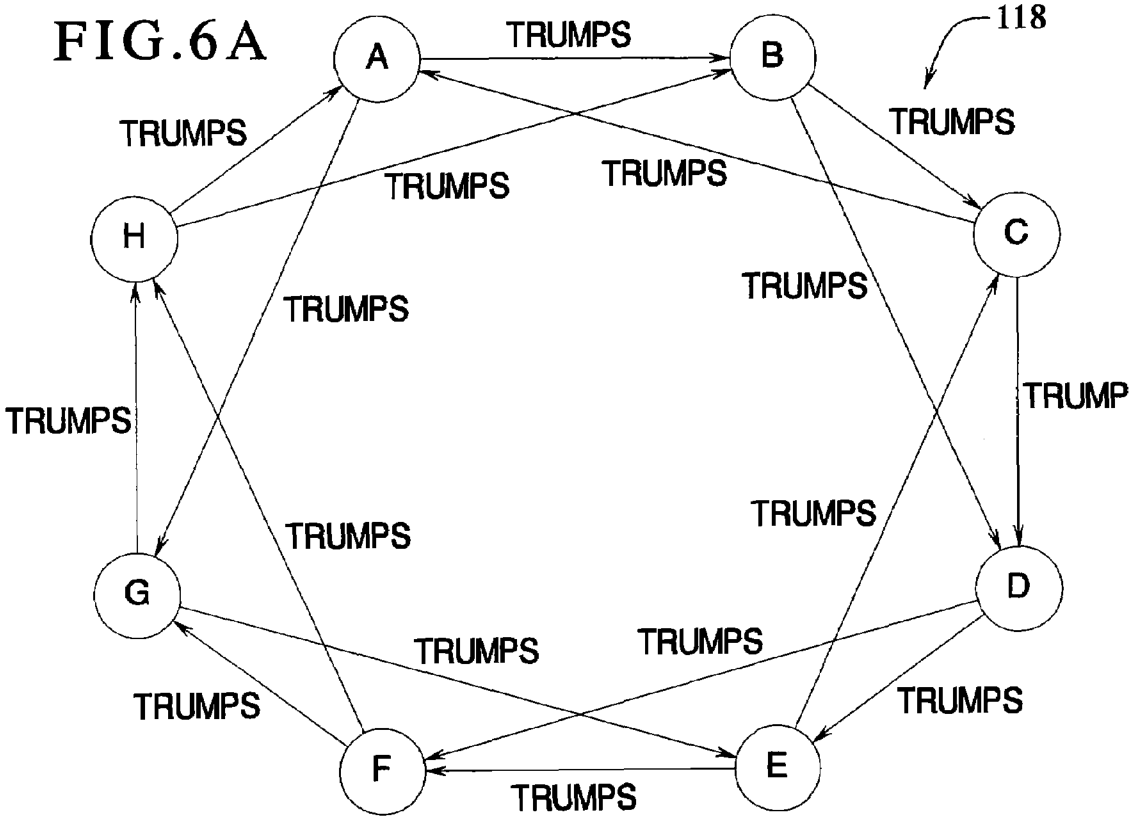
FIGS. 6A through 6C are a diagram and tables that illustrate an eight choice embodiment, wherein each choice of the embodiment does not either trump or become trumped by every other choice of the embodiment.

Referring now to FIGS. 6A through 6C, the present invention includes an eight choice embodiment, wherein each choice of the embodiment either trumps, ties or is trumped by another but not every other choice of the embodiment. FIG. 6A illustrates a choice structure 118, which includes eight choices "A" through "H," and which the game preferably displays to the player via one of the display devices 30 or 32. The choices can be areas of a touch screen 50 (FIG. 2) or be associated with one or more electromechanical selectors. Arrows pointing from one choice to another indicate that: "A" trumps "B," "A" trumps "G," "B" trumps "C," "B" trumps "D," "C" trumps "A," "C" trumps "D," "D" trumps "E," "D" trumps "F," "E" trumps "C," "E" trumps "F," "F" trumps "G," "F" trumps "H," "G" trumps "E," "G" trumps "H," "H" trumps "A" and "H" trumps "B." FIG. 6B illustrates a choice comparison database 120, which includes the comparisons or comparators of FIG. 6A. The memory device 40 (FIG. 2) stores the choice comparison table or database 120, which the processor 38 accesses at the appropriate moment.

It should be appreciated that in the choice structure 118, each choice does not either trump or become trumped by every other choice. For example, there is no comparator, i.e., no winner or loser for the choices "A" and "D," "A" and "E," and "A" and "F." The present invention contemplates ties or draws, such that the game's random generation of the choice "A" and the player's selection of the choice "D" preferably generates a draw and a try again.

Even though the choice structure 118 includes an even number of choices such as eight, the structure 118 maintains an equal percentage of any choice winning or losing. The game enables the equal percentage by not providing a comparator for all choice combinations and by providing an even number of choice combinations for each choice. As illustrated by the choice structure 118 and the comparison database 120, each choice trumps two other choices and is trumped by two other choices. The game preferably maintains a choice generation table or database 122 in the memory device 40, which is equally weighted, i.e., there is 12.5% that the game generates each choice "A" through "H."

Referring now to FIGS. 7A through 7D, the present invention contemplates outcome databases having different probability distributions, wherein the game employs the databases to generate an outcome and thereby determine a game choice. In embodiments employing one of the outcome databases, the game generates an outcome, accepts the player's input of a choice and uses the appropriate comparator to determine the game's choice.

In FIG. 7A, the game maintains an outcome database 124, which includes an equal 33.3% chance that the player wins, loses or ties. In FIG. 7B, the game maintains an outcome database 126 whereby the player is as likely to tie as to win or lose. In FIG. 7C, the game maintains an outcome database 128 whereby the player is more likely to win than to tie and more likely to win than to lose. In FIG. 7D, the game maintains an outcome database 130 whereby the player is equally likely to win or lose, but more likely to win than to tie and more likely to lose than to tie. It should be appreciated from the foregoing examples, that the gaming device implementor can structure the outcome databases to produce any desired outcome probability distribution.

Preferred Method of Operation

Figure 8:
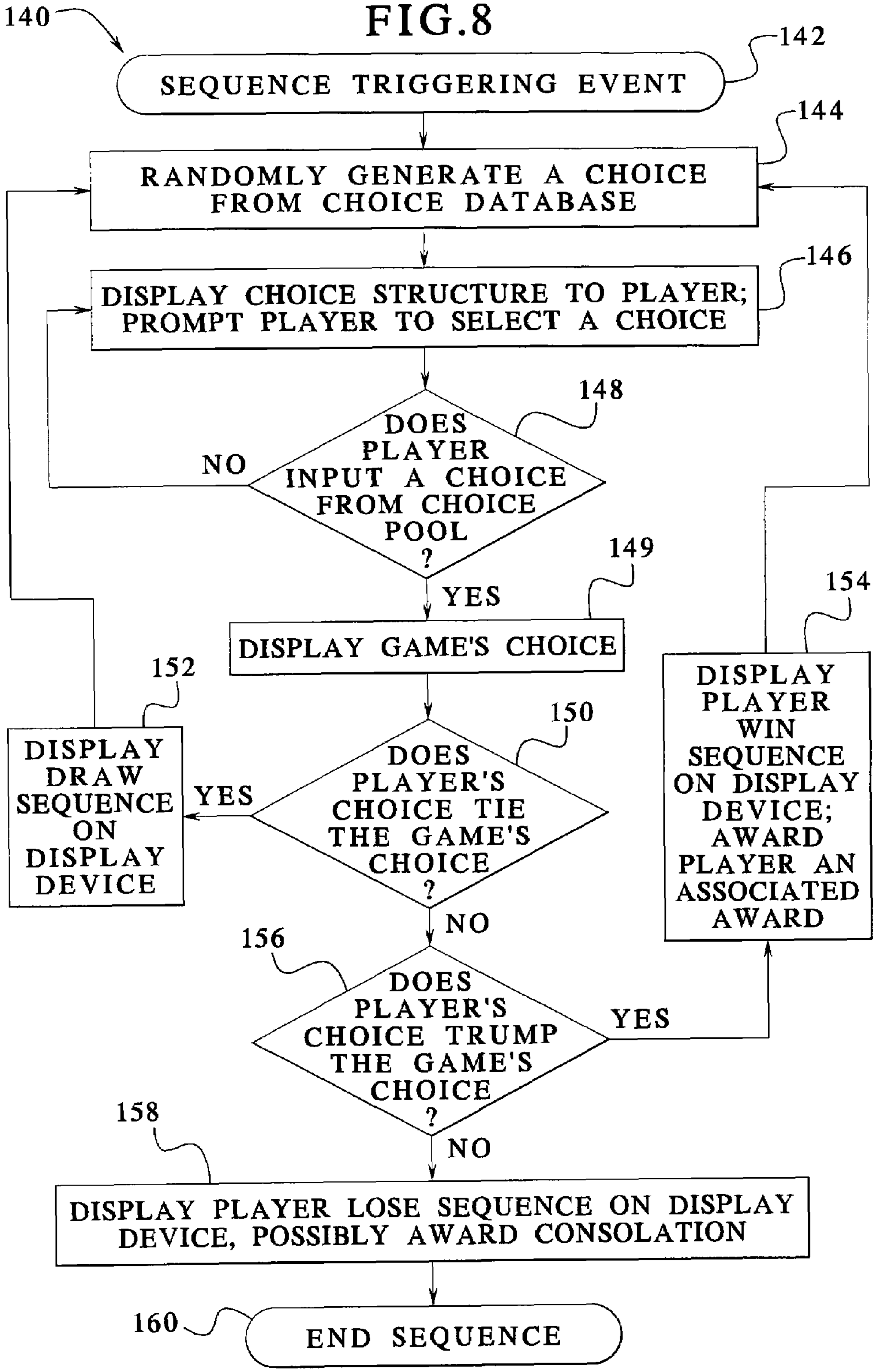
FIG. 8 is a flow diagram of one preferred embodiment of the present invention, wherein the game randomly generates a choice and thereby determines an outcome.

Referring now to FIG. 8, one preferred method 140 of the present invention is illustrated, wherein the game randomly generates a choice and thereby determines an outcome. Upon a sequence triggering event, as indicated by the oval 142, the game generates a choice from an equally or unequally weighted choice database, as indicated by the block 144. The game displays a choice structure to the player and prompts the player to select a choice, as indicated by the block 146. The game awaits the player's decision, as indicated by the diamond 148.

If the player does not input a decision, the game continues to display the choice structure and prompt the player, as indicated by the block 146. If the player inputs a decision, the game displays its choice, as indicated by the block 149, and thus determines whether player's choice ties the game's choice, as indicated by the diamond 150.

Referring to the choice structures 100, 106 and 112 of FIGS. 3A, 4A and 5A, respectively, a tie occurs when the game randomly generates the same choice that the player selects. If both the game and the player choose "B," the game determines a tie or draw. Referring to the choice structure 118 of FIG. 6A, a tie occurs when the game randomly generates the same choice that the player selects and when the game and player generate choices having no comparator. In the structure 118, for example, neither the choices "B" or "F" trumps the other, so a tie occurs.

If a tie occurs, as indicated by a positive response to the diamond 150, the game displays a draw or tie sequence on one of the display devices 30 or 32, as indicated by the block 152, and the game resets the sequence by randomly generating a new choice, as indicated by the block 144. In an alternative embodiment, the game additionally awards the player an associated award upon a tie. The tie award is preferably less than an award associated with a player win result. A draw or tie sequence can be any display indicating a neutral outcome. The draw or tie outcome is effectively a gaming device nullity, wherein the player and game start over as if the previous choice selections have not occurred. If a tie does not occur, as indicated by a negative response to the query of the diamond 150, the game determines whether player's choice trumps the game's choice, as indicated by the diamond 156.

Referring to the comparison databases 102, 108 and 114 of FIGS. 3B, 4B and 5B, respectively, the game applies the appropriate comparator from an appropriate database to the game's generated choice and the player's inputted choice. If in an embodiment such as the choice structure 118 of FIG. 6A, there is no appropriate comparator in the appropriate database for the game's generated choice and the player's inputted choice, the game determines that a tie has occurred, as indicated above by a positive response to the query of diamond 148.

If the player's choice trumps the game's choice, the game displays a player win sequence on one of the display devices 30 or 32 and awards the player an associated award, as indicated by the block 154. A player win sequence can be any display indicating a positive player outcome. The win outcome improves the player's status quo. That is, in a bonus round, the only loss the player experiences is a theoretical loss or a loss of potential awards. With a win outcome, then, the player's award total starts at zero or some point of status quo and adds thereto. The game resets the sequence by randomly generating a new choice, as indicated by the block 144.

If the player's choice does not trump the game's choice, as indicated by a negative response to the diamond 156, the game: (i) displays a player lose sequence on one of the display devices 30 or 32; (ii) alternatively awards a consolation award, as indicated by the block 158; and (iii) ends the sequence, as indicated by the oval 160. A suitable player lose sequence is any that indicates a negative player outcome. As mentioned above, the bonus game only adds to the player's awards. The player's loss includes the loss of continued play or potential awards. That is, the player does not risk and thereby lose previously achieved awards in a game of the present invention.

It should be appreciated that the player continues play, i.e., winning and accumulating awards or tying and trying again, until the game's choice trumps the player's choice. The player keeps any accumulated award achieved before the game's choice trumps the player's choice.

Award Types and Award Structures

The win awards, tie awards and consolation awards are preferably game credits although other awards are contemplated by the present invention. For example, the win awards and consolation awards can be game credit multipliers that multiply: (i) a win along one or more paylines; (ii) a total bet; (iii) a prior bonus round win; or (iv) any other suitable game credit amount. The associated awards can be a number representing any type of value, such as a number of selections from a prize pool.

In one award selection embodiment, the win awards and consolation awards are associated with the comparators. That is, the comparison databases 102, 108 and 114 of FIGS. 3B, 4B and 5B, respectively, include having a separate column or columns (not illustrated) that associate a win award and/or a consolation award with each comparator. Associating a consolation award with each comparator guarantees the player of at least a consolation prize, i.e., if the game's choice trumps the player's choice on the initial try, the player receives the consolation award associated with the applied comparator.

Referring now to FIG. 9, another random award selection embodiment includes a prize pool or database 162 having a win column 164, a consolation column 166 and a percent column 168. In this embodiment, when the player's choice trumps the game's choice, the game randomly selects one of the prizes from the win column 164. The game weights the random generation using the percent values provided in the percent column 168, such that the game is more likely to generate a "3" award than a "40" award.

When the game's choice trumps the player's choice, the game in one embodiment randomly selects one of the consolation prizes from the consolation column 166. The consolation prizes are typically less and have less variation than do the win prizes. The game also weights the consolation award generation. The present invention also contemplates including "0" consolation awards, such that the player sometimes receives a consolation award and other times receives nothing.

In a further award selection embodiment, the game always provides the same award and/or consolation award when the player wins and/or loses, respectively. This embodiment does not require a separate private pool or database, such as the one disclosed in connection with FIG. 9. In this embodiment, the game evenly accumulates, e.g., 3×, 6×, 9×, etc., each time the player wins.

Alternative Method of Operation

Figure 10:
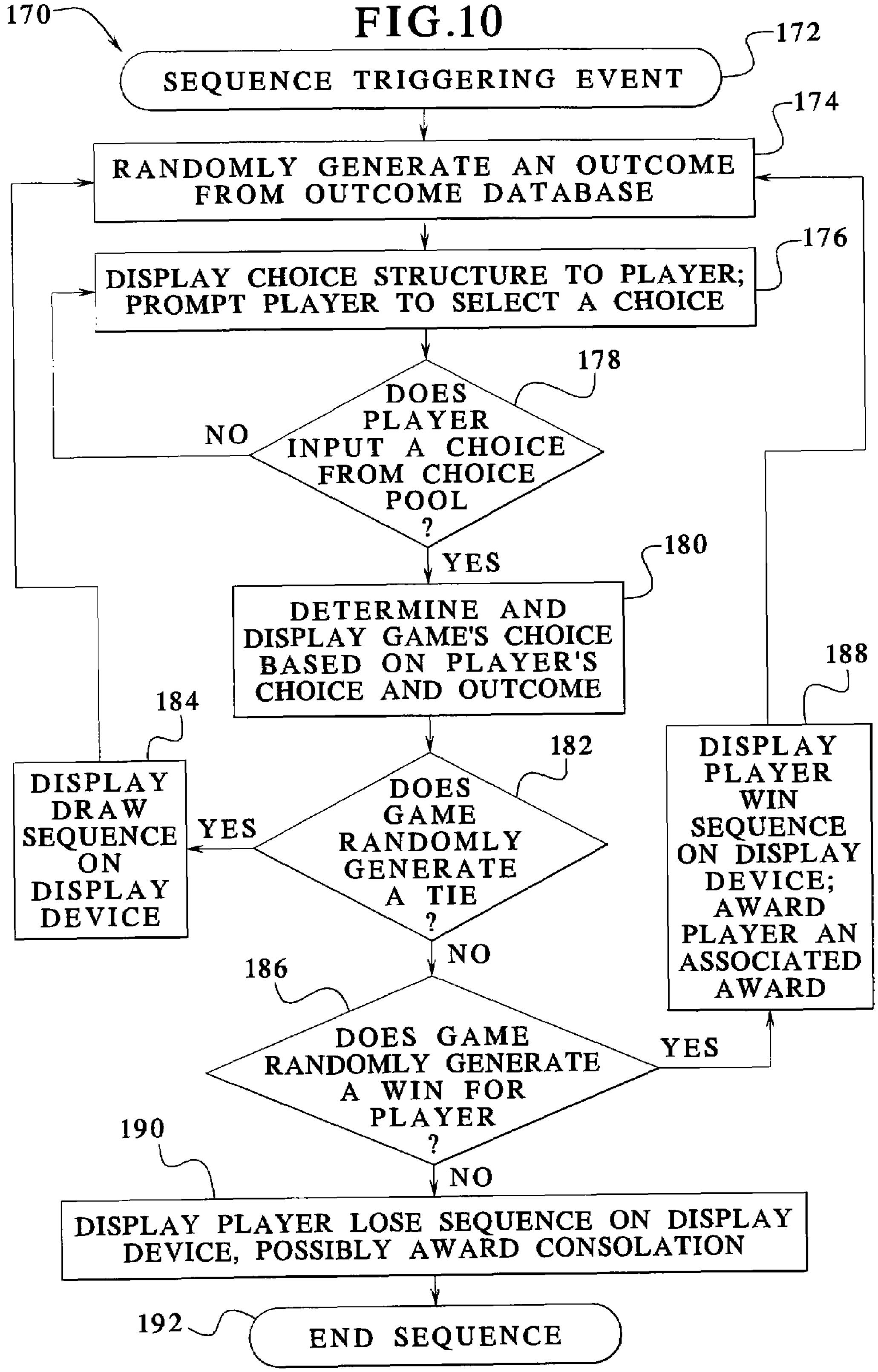
FIG. 10 is a flow diagram of an alternative embodiment of the present invention, wherein the game randomly generates an outcome and thereby determines its choice.

Referring now to FIG. 10, an alternative embodiment 170 of the present invention is illustrated, wherein the game randomly generates an outcome and thereby determines a choice. Upon a sequence triggering event, as indicated by the oval 172, the game generates a win, lose or draw outcome from an equally or unequally weighted outcome database, such as one of FIGS. 7A through 7D, as indicated by the block 174. The game displays a choice structure to the player and prompts the player to select a choice, as indicated by the block 176. The game awaits the player's decision, as indicated by the diamond 178.

If the player does not input a decision, the game continues to display the choice structure and prompt the player, as indicated by the block 176. If the player inputs a decision, the game determines and displays its choice based on the player's choice and the randomly generated outcome, as indicated by the block 180.

Referring to the comparison databases 102, 108 and 114 of FIGS. 3B, 4B and 5B, respectively, to determine its choice, the game proceeds backwards from the generated outcome, applying the appropriate comparator from an appropriate database and using the player's inputted choice. In certain instances, the game chooses between two possibilities. For instance, if the game randomly generates a player win from an outcome database, and the player inputs a choice "A" provided by the choice structure 106 of FIG. 4A, the game can choose the choice "B" or "D," which are both trumped by the choice "A."

If the game randomly generates a tie in an embodiment such as the choice structures 100, 106 and 112, of FIGS. 3A, 4A and 5A, respectively, wherein each choice trumps or is trumped by each other choice, the game only has one choice. For instance, if the game randomly generates a tie or draw from an outcome database, and the player inputs a choice "B" provided by the choice structure 100 of FIG. 3A, the game can only choose the choice "B," which is the only choice that can tie the player's choice.

If the game randomly generates a tie in an embodiment such as the choice structure 118 of FIG. 6A, wherein each choice does not trump or become trumped by every other choice, the game has a plurality of choices. For instance, if the game randomly generates a tie or draw from an outcome database, and the player inputs a choice "F" provided by the choice structure 118 of FIG. 6A, the game can choose the choice "F" or any choice that does not have a comparator in combination with "F," namely choices "A," "B" or "C."

If the game generates a tie, as indicated by a positive response to the query of the diamond 182, the game displays a draw or tie sequence on one of the display devices 30 or 32, as indicated by the block 184, and the game resets the sequence by randomly generating a new choice, as indicated by the block 174. In an alternative embodiment, the game additionally awards the player an associated award upon a tie. The tie award is preferably less than an award associated with a player win result. A draw or tie sequence can be any display indicating a neutral outcome. As described in connection with FIG. 8, a tie or draw outcome thereby preserves the player's status quo. If the game did not generate a tie, as indicated by a negative response to the query of the diamond 182, the game determines whether the game generated a win for the player, as indicated by the diamond 186.

If the game generated a win for the player, as indicated by a positive response to the query of the diamond 186, the game displays a player win sequence on one of the display devices 30 or 32 and awards the player an associated award, as indicated by the block 188. A player win sequence can be any display indicating a positive player outcome. As described above in connection with FIG. 8, a win outcome improves the player's status quo.

The game awards the player in the manner and type described above in connection with the preferred embodiment of FIG. 8. The game resets the sequence by randomly generating a new choice, as indicated by the block 174.

If the game did not generate a win for the player, as indicated by a negative response to the query of the diamond 186, the game: (i) displays a player lose sequence on one of the display devices 30 or 32; (ii) alternatively awards a consolation award, as indicated by the block 190; and (iii) ends the sequence, as indicated by the oval 192. A suitable player lose sequence is any that indicates a negative player outcome. The lose outcome deprives the player of further award generation opportunity. That is, the player continues play, i.e., winning and accumulating awards or tying and trying again, until the game randomly generates a loss for the player. The player keeps any accumulated award achieved before the game generates a loss.

Example Embodiment

Referring now to FIGS. 11A through 11D, one of the display devices 30 or 32 displays a well known rock, paper, scissors game, which is an example of a three choice embodiment of the present invention. Rock, paper, scissors employs the choice structure 100 of FIG. 3A, wherein rock smashes or trumps scissors, scissors cuts or trumps paper and paper covers or trumps rock. In rock, paper, scissors, each choice either trumps or is trumped by every other choice. There is a fifty percent chance that the player selects a choice that trumps the game's choice. In this example embodiment, the game is equally likely to choose rock, paper or scissors.

Figure 11A:
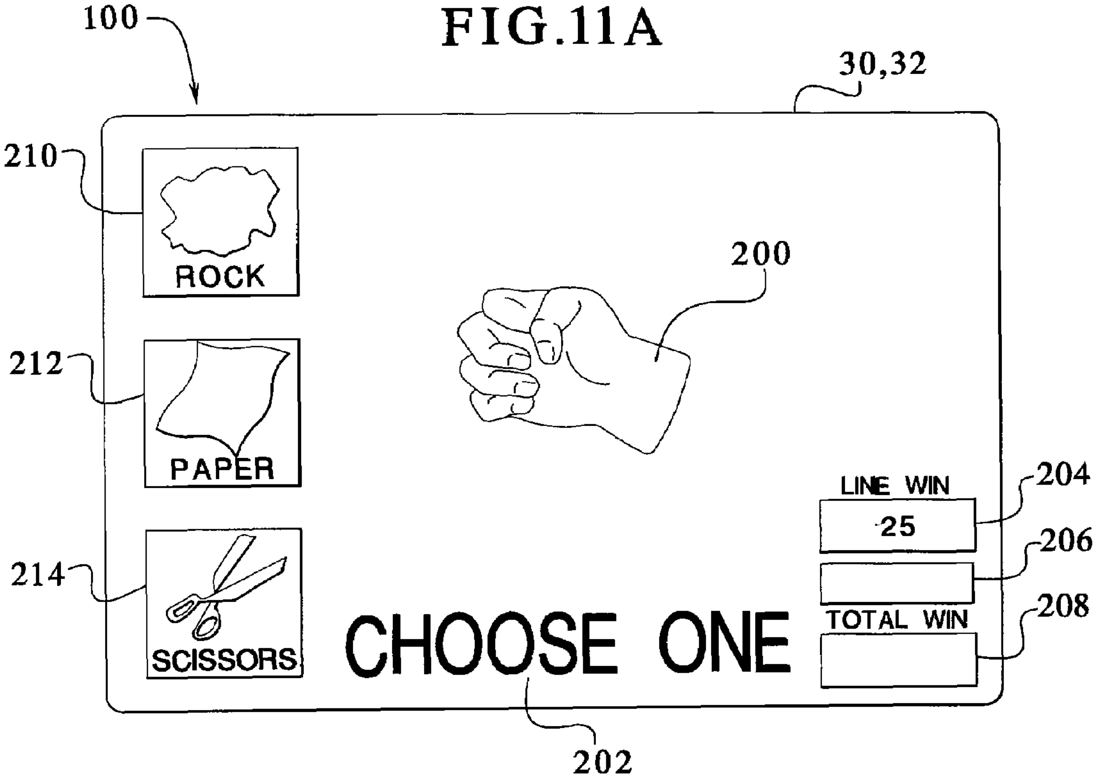
FIGS. 11A through 11D are front elevational views of one of the display devices of FIGS. 1A and 1B, which illustrate one example display embodiment of the present invention, wherein the choices are a rock, paper and scissors.

In an entertaining and exciting audiovisual display, the game represents its selection of a choice via an indicator 200. FIG. 11A illustrates the game prompting the player to select a choice of rock, paper or scissors via the visual or audiovisual message 202. If the player wins, the game multiplies the player's win along a payline 56 (FIGS. 1A and 1B), indicated in a line win display 204 as twenty-five credits, by an accumulating multiplier indicated in a multiplier display 206 to form a total win indicated in a total win display 208. The player selects from the choice structure 100 by selecting the rock selector 210, the paper selector 212 or the scissors selector 214.

Figure 11B:
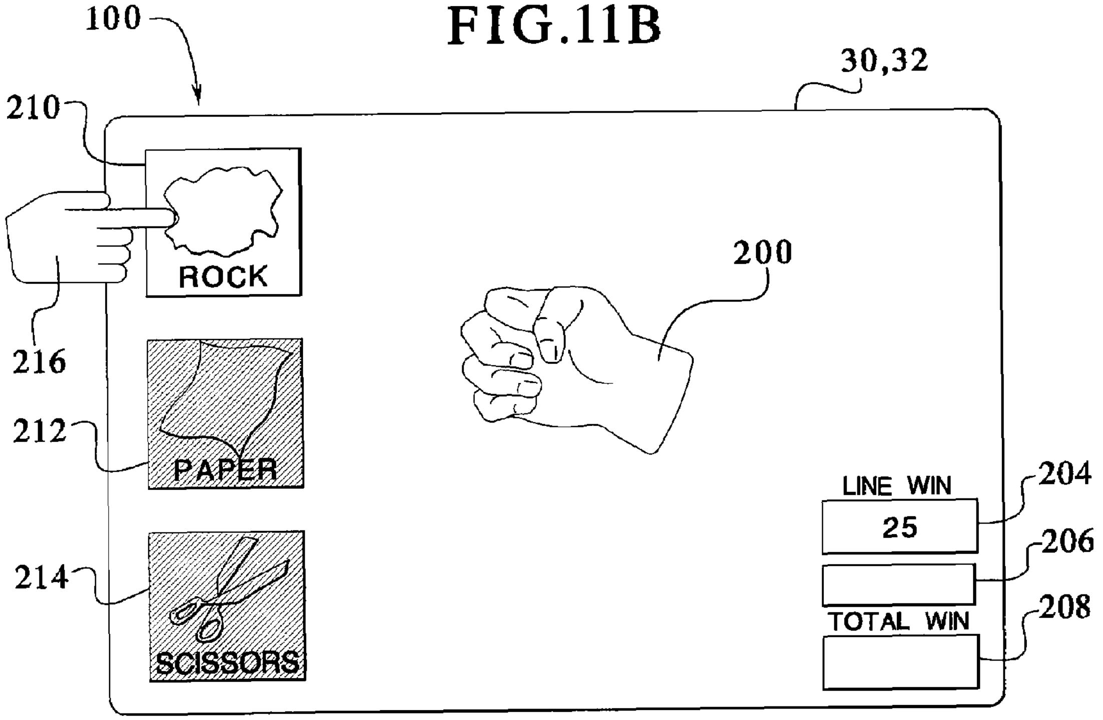
Figure 11C:
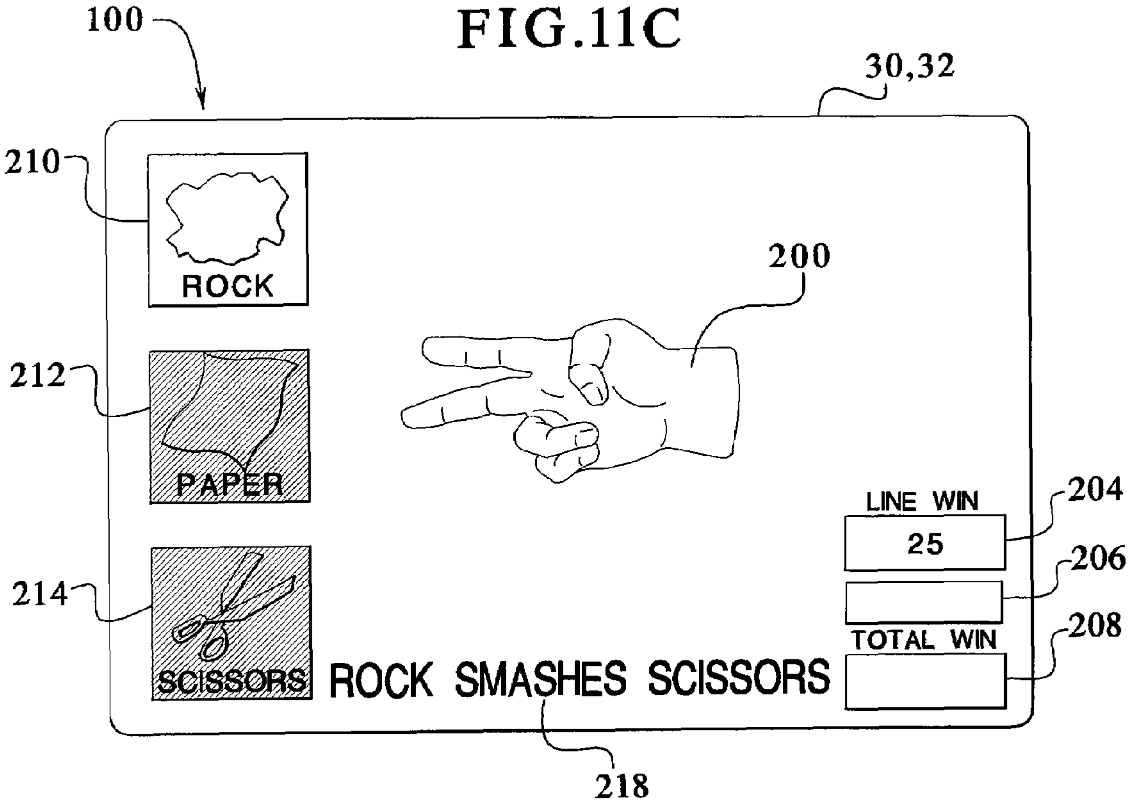

FIG. 11B illustrates that the player 216 selects the rock selector 210. The present invention also requires a selection by the game of a rock, paper, scissors choice before the game is enabled to make a comparison or employ a comparator. FIG. 11B therefore does not yet illustrate a player win or loss. FIG. 11C illustrates that the indicator 200, representing the game's choice, selects the scissors choice. It should be appreciated that in rock, paper, scissors, players shake their hands a plurality of times before picking a closed fist that is a rock choice, a flat, open horizontal hand that is a paper choice and two extended fingers that is a scissors choice. In FIG. 11C, then, the game selects the scissors choice by displaying the indicator 200 with two extended fingers.

Figure 11D:
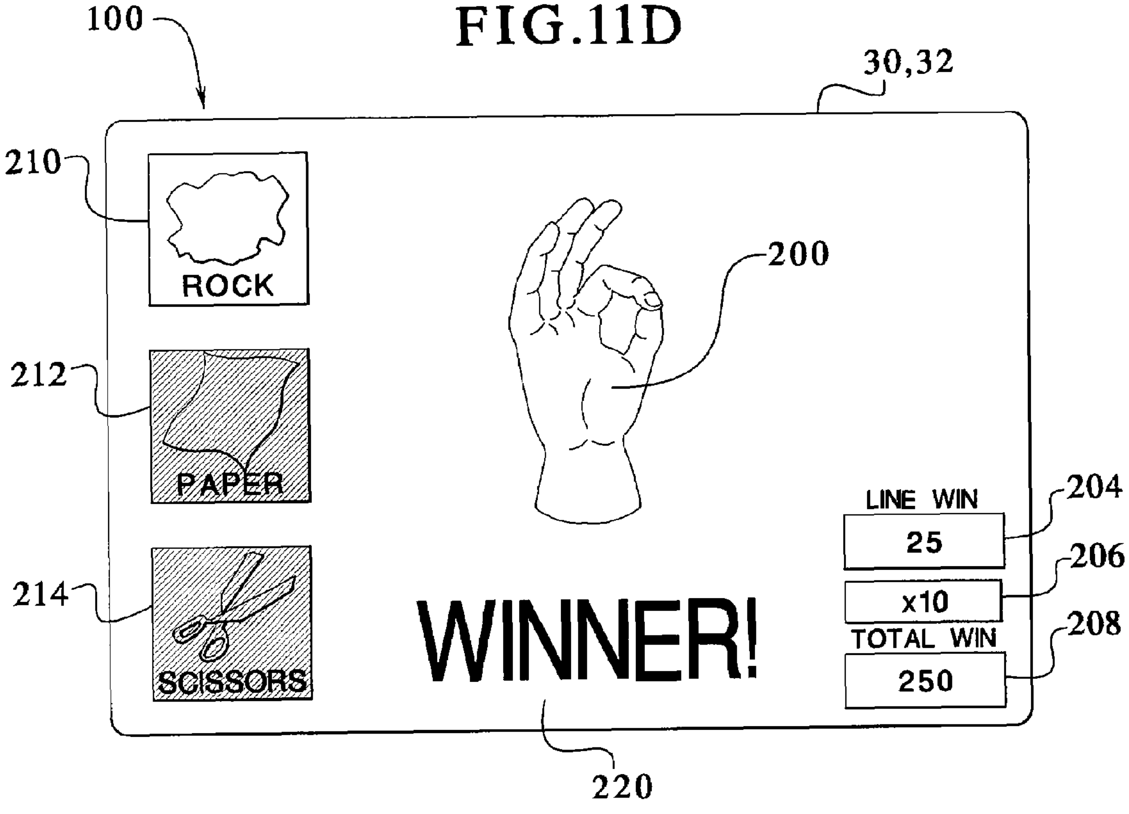

FIG. 11C also displays the appropriate comparison or comparator 218 between a rock choice and a scissors choice. That is, "rock smashes or trumps scissors." The player therefore wins this particular game of rock, paper, scissors. FIG. 11D displays a suitable visual or audiovisual indicator 220 that the player has won. FIG. 11D further illustrates that the game rewards the player by multiplying the player's payline 56 win (preferably the win along the payline having the symbol or symbol combination triggering the bonus) of twenty-five credits shown in the line win display 204 by the multiplier of ten shown in the multiplier display 206 to form a total win of 250 credits shown in the total win display 208.

It should be appreciated that the preferred display embodiment of FIGS. 11A through 11D includes both the methods disclosed in connection with FIGS. 8 and 10. That is, respectively, the game includes randomly selecting the scissors choice and thereby applying the appropriate compactor to generate a win or lose outcome for the player. The game alternatively includes randomly generating a win or lose outcome for the player and thereby applying the appropriate comparator to select a choice, i.e., the scissors, which is trumped by the player's choice of a rock.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operable under control of at least one processor, said gaming device comprising:

a display device controlled by the at least one processor;

at least one input device in communication with the at least one processor; and at least three choices, wherein each choice trumps or is trumped by at least one other choice;

wherein the at least one processor is programmed to operate with the display device and the input device to:

(a) cause the display of said choices, (b) enable a player to select one of said choices using said input device, (c) display an additional selection of one of said choices, (d) compare the player's choice with the additional choice, (e) provide the player a player win outcome if the player's choice trumps the additional choice, (f) provide the player a draw outcome if the additional choice does not trump the player's choice and the player's choice does not trump the additional choice, and (g) provide the player a player lose outcome if the additional choice trumps the player's choice, wherein said player lose outcome is a loss of a further opportunity to generate player win outcomes without lessening any previous player win outcome provided to the player.

2. The gaming device of claim 1, wherein a first choice trumps a second choice, said second choice trumps a third choice, and said third choice trumps said first choice.

3. The gaming device of claim 1, wherein a plurality of said choices trump or are trumped by a plurality of other of said choices.

4. The gaming device of claim 1, wherein each of said choices trumps or is trumped by each other of said choices.

5. The gaming device of claim 1, wherein each of said choices trumps or is trumped by a plurality of other of said choices.

6. The gaming device of claim 1, wherein each choice either trumps or is trumped by each other choice, and said at least one processor is programmed to provide the draw outcome when the additional choice is the same as the player's choice.

7. The gaming device of claim 1, which includes at least one choice that does not trump and is not trumped by at least one other choice.

8. The gaming device of claim 1, wherein the at least one processor is programmed to select the additional choice.

9. The gaming device of claim 8, wherein said choices are weighted such that at least one choice is more likely to be selected by the at least one processor than at least one other choice.

10. The gaming device of claim 1, wherein said player win outcome includes an award provided to the player and chosen from the group consisting of: game credits and game credit modifiers.

11. The gaming device of claim 1, wherein said draw outcome includes a draw award chosen from a group consisting of: game credits and game credit modifiers.

12. The gaming device of claim 1, wherein said player lose outcome includes a game consolation award chosen from the group consisting of: game credits and game credit modifiers.

13. The gaming device of claim 1, which includes at least one award database, wherein said at least one processor is programmed to randomly generate an award from a plurality of possible awards in said database upon providing said player win outcome.

14. The gaming device of claim 13, wherein said awards are weighted such that at least one award is more likely to be randomly generated than at least one other award.

15. The gaming device of claim 1, wherein said at least one processor is programmed to randomly generate a consolation award upon providing said player lose outcome.

16. The gaming device of claim 1, wherein said at least one processor is programmed to randomly generate a draw award upon providing said player draw outcome, said draw award being less than an award generated upon a player win outcome.

17. A gaming device operable under control of at least one processor, said gaming device comprising:

a display device controlled by the at least one processor;

at least one input device in communication with the at least one processor; and at least three choices, wherein each choice either trumps or is trumped by at least one other choice;

wherein the at least one processor is programmed to operate with the display device and the input device to:

(a) cause the display of said choices, (b) enable a player to select one of said choices using said input device, (c) display an additional selection of one of the choices not selected by the player, (d) compare the player's choice and the additional choice, (e) provide a player win outcome if the player's choice trumps the additional choice, (f) provide a draw outcome if the player's choice does not trump the additional choice and the additional choice does not trump the player's choice, and (g) provide a player lose outcome if the additional choice trumps the player's choice, wherein said player lose outcome is a loss of further opportunity to generate player win outcomes without lessening any previous player win outcome provided to the player.

18. The gaming device of claim 17, wherein a plurality of said choices trump or are trumped by a plurality of other of said choices.

19. The gaming device of claim 17, wherein each of said choices trumps or is trumped by each other of said choices.

20. The gaming device of claim 17, which includes at least one choice that does not trump and is not trumped by another choice.

21. The gaming device of claim 17, wherein said at least one processor is programmed to determine which choices trump other choices using a choice database.

22. The gaming device of claim 17, wherein the at least one processor is programmed to select the additional choice.

23. The gaming device of claim 22, wherein said choices are weighted such that at least one choice is more likely to be selected by the at least one processor than at least one other choice.

24. The gaming device of claim 17, wherein said player win outcome includes an award chosen from the group consisting of: games credits and game credit modifiers.

25. The gaming device of claim 17, wherein said draw outcome includes a draw award chosen from a group consisting of: game credits and game credit modifiers.

26. The gaming device of claim 17, wherein said player lose outcome includes a game consolation award chosen from the group consisting of: game credits and game credit modifiers.

27. The gaming device of claim 17, which includes at least one award database, wherein said at least one processor is programmed to randomly generate an award from a plurality of possible awards upon providing said player win outcome.

28. The gaming device of claim 27, wherein said awards are weighted such that at least one award is more likely to be randomly generated than at least one other award.

29. The gaming device of claim 17, wherein said at least one processor is programmed to randomly generate a consolation award upon providing said player lose outcome.

30. The gaming device of claim 17, wherein said at least one processor is programmed to randomly generate a draw award upon providing said draw outcome, said draw award being less than an award provided to the player upon a player win outcome.

31. A gaming device operable under control of at least one processor, said gaming device comprising:

a game;

a display device controlled by the at least one processor;

at least one input device in communication with the at least one processor;

a plurality of possible comparisons displayable by said display device in the game; and at least three choices in each comparison, wherein each choice either trumps or is trumped by at least one other of said choices;

wherein the at least one processor is programmed to operate with the display device and the input device for each displayed comparison to:

(a) display said choices of said comparison, (b) enable a player to select one of said choices using the input device, (c) randomly generate one of a win outcome, a draw outcome, and a lose outcome for the player, (d) select one of the choices which is trumped by the player's choice if the generated outcome is the win outcome, wherein the processor provides an award to the player and displays at least one additional comparison in the game when the generated outcome is the win outcome, (e) select one of the choices which does not trump and is not trumped by the selected choice if the generated outcome is the draw outcome, wherein the processor displays at least one additional comparison in the game when the generated outcome is the draw outcome, (f) select one of the choices which trumps the player's choice if the generated outcome is the lose outcome, wherein the processor does not display another comparison in the game when the generated outcome is the lose outcome, and wherein the lose outcome is a loss of a further opportunity to generate player win outcomes, and (g) repeat (a) to (f) until the processor stops displaying comparisons in the game or until there are no comparisons remaining in the game.

32. The gaming device of claim 31, wherein the first choice trumps the second choice, said second choice trumps the third choice, and said third choice trumps said first choice.

33. The gaming device of claim 31, wherein a plurality of said choices trump or are trumped by a plurality of other of said choices.

34. The gaming device of claim 31, wherein each of the choices either trumps or is trumped by each other choice, such that the processor's choice is the same as the player's choice upon the processor's generation of the draw outcome.

35. The gaming device of claim 31, wherein at least one of the choices does not trump and is not trumped by at least one of the other choices.

36. The gaming device of claim 31, which includes at least four choices, wherein at least one choice does not trump and is not trumped by at least one other choice.

37. The gaming device of claim 31, wherein said at least one processor is programmed to determine which of the choices trump other choices using a weighted database.

38. The gaming device of claim 31, wherein said outcomes are weighted such that at least one of the outcomes is more likely to be generated by the at least one processor than at least one other outcome.

39. The gaming device of claim 31, wherein for a processor-generated outcome, at least two choices are available to the at least one processor to be selected.

40. The gaming device of claim 31, wherein the processor is programmed to display the selected choice and the generated outcome.

41. The gaming device of claim 31, wherein said win outcome yields an award provided to the player and chosen from the group consisting of: games credits and game credit modifiers.

42. The gaming device of claim 31, wherein said draw outcome yields an award chosen from the group consisting of: game credits and game credit modifiers.

43. The gaming device of claim 31, wherein said draw outcome includes a replay of a game event.

44. The gaming device of claim 31, wherein said lose outcome yields a consolation award chosen from the group consisting of: game credits and game credit modifiers.

45. The gaming device of claim 31, wherein the lose outcome does not lessen any previous win outcome provided to the player.

46. The gaming device of claim 31, which includes at least one award database, wherein said at least one processor is programmed to randomly generate an award from a plurality of possible awards in said database upon the generation of said player win outcome.

47. The gaming device of claim 46, wherein said possible awards of the database are weighted such that at least one award is more likely to be randomly generated than at least one other award.

48. The gaming device of claim 31, wherein said at least one processor is programmed to randomly generate a consolation award upon the generation of said lose outcome.

49. The gaming device of claim 31, wherein said at least one processor is programmed to randomly generate a draw award upon the generation of said draw outcome, said draw award being less than the award provided to the player upon the win outcome.

50. A method for operating a gaming device, said method comprising:

(a) displaying at least three choices, wherein each choice trumps or is trumped by at least one other choice;

(b) enabling a player to select one of said choices;

(c) causing a generation of a choice from said choices;

(d) comparing said player's choice to said generated choice;

(e) providing a player win outcome if the player's choice trumps said generated choice;

(f) providing a draw outcome if the player's choice does not trump the generated choice and the generated choice does not trump the player's choice; and (g) providing a player lose outcome if said generated choice trumps said player's choice, wherein said player lose outcome is a loss of a further opportunity to generate player win outcomes without lessening any previous player win outcome provided to the player.

51. The method of claim 50, which includes repeating (a) through (g) until providing a player lose outcome.

52. The method of claim 50, wherein providing a draw outcome includes providing an award to said player.

53. The method of claim 50, which includes causing a processor to select the generated choice.

54. The method of claim 50, which includes causing a processor to randomly select the generated choice.

55. The method of claim 50, wherein (a) to (g) are provided through a data network.

56. The method of claim 55, wherein the data network is an internet.

57. A method for operating a gaming device, said method comprising:

(a) displaying at least three choices, wherein each choice trumps or is trumped by at least one other choice;

(b) enabling a player to select one of the choices;

(c) causing a generation of one of said choices not selected by the player;

(d) comparing said player's choice to said generated choice;

(e) providing a player win outcome if the player's choice trumps said generated choice;

(f) providing a draw outcome if the player's choice does not trump the generated choice and the generated choice does not trump the player's choice; and (g) providing a player lose outcome if said generated choice trumps said player's choice, wherein said player lose outcome is a loss of a further opportunity to generate player win outcomes without lessening any previous player win outcome provided to the player.

58. The method of claim 57 which includes repeating (a) through (g) until providing a player lose outcome.

59. The method of claim 57, wherein providing a draw outcome includes providing an award to said player.

60. The method of claim 57, which includes causing a processor to select the generated choice.

61. The method of claim 57, which includes causing a processor to randomly select the generated choice.

62. The method of claim 57, wherein (a) to (g) are provided through a data network.

63. The method of claim 62, wherein the data network is an internet.

64. A method for operating a gaming device, said method comprising:

(a) displaying a comparison including at least three choices in a game, wherein each choice trumps or is trumped by at least one of other of said choices;

(b) enabling a player to select one of the choices;

(c) randomly generating one of a win outcome, a draw outcome and a lose outcome for the player;

(d) picking one of the choices that is trumped by the player's choice if the generated outcome is the win outcome, wherein an award is provided and at least one additional comparison is displayed to the player when the generated outcome is the win outcome;

(e) picking one of the choices that does not trump and is not trumped by the player's choice if the generated outcome is the draw outcome, wherein at least one additional comparison is displayed to the player when the generated outcome is the draw outcome;

(f) picking one of the choices that trumps the player's choice if the generated outcome is the lose outcome, wherein another comparison is not displayed to the player when the generated outcome is the lose outcome, and wherein said lose outcome is a loss of a further opportunity to generate player win outcomes; and (g) repeating (a) to (f) until the displayed comparisons end or there are no comparisons remaining in the game.

65. The method of claim 64, which includes displaying the picked choice and the generated outcome to the player.

66. The method of claim 64 which includes repeating (a) through (g) until generating the player lose outcome.

67. The method of claim 64, wherein the player lose outcome does not lessen any previous win outcome provided to the player.

68. The method of claim 64, wherein (a) to (g) are provided through a data network.

69. The method of claim 68, wherein the data network is an internet.

* * * * *